March 17, 1953 C. G. REBER 2,631,332
INTERNAL SPREADER FOR GUSSETING LAYFLAT TUBING
Filed June 23, 1949
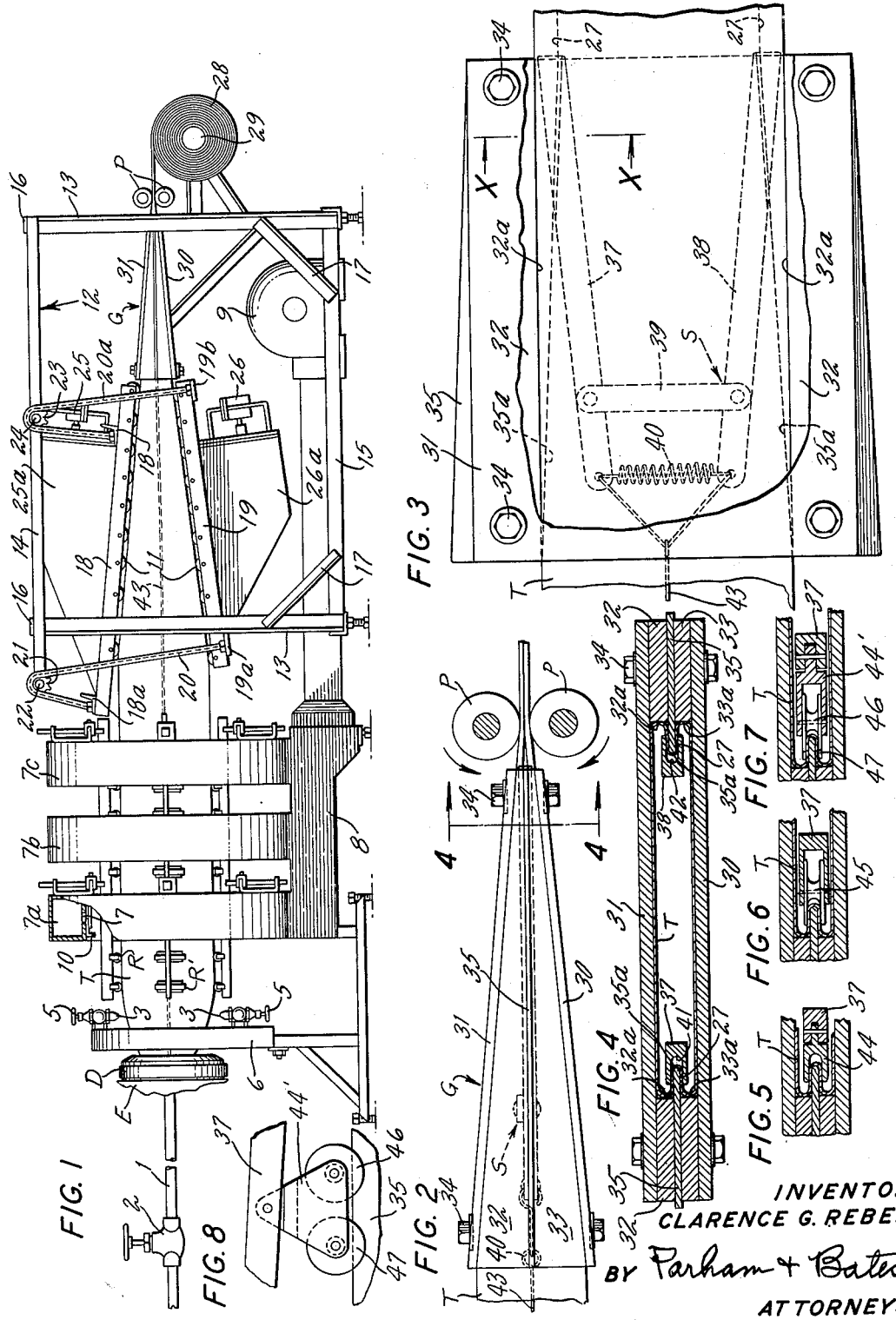
INVENTOR
CLARENCE G. REBER
BY Parham + Bates
ATTORNEYS Patented Mar. 17, 1953

2,631,332

UNITED STATES PATENT OFFICE 2,631,332

INTERNAL SPREADER FOR GUSSETING LAYFLAT TUBING

Clarence G. Reber, Newington, Conn., assignor to Plax Corporation, West Hartford, Conn., a corporation of Delaware Application June 23, 1949, Serial No. 100,831

9 Claims. (Cl. 18—14)

The present invention relates to the manufacture of gusseting thin wall seamless tubing formed of thermoplastic materials and more particularly to improvements in the apparatus illustrated and described in Patent No. 2,544,044, issued March 6, 1951, to Dalzell and the present inventor. Polyethylene is an example of thermoplastic material which, under suitable temperature and pressure conditions, can be extruded in the form of seamless tubing of a desired thickness and size.

As is pointed out in the above-mentioned patent, there is a tremendous demand in the packaging and related fields for flexible plastic tubing of various diameters and wall thicknesses of a few thousandths of an inch. In order to satisfy a large part of this demand, the tubing must be supplied in rolls of continuous lengths which are gusseted along opposite diametrical lengths of the tubing and collapsed. The gussets or tucks must be of uniform size and preferably of equal depth. Prior to the earlier invention, considerable difficulty had been experienced in extruding and forming, in a continuous operation, tubing which would satisfy these requirements. The close tolerance requirements which include holding to uniform diameters and thickness, and to uniform collapsed or flat widths with gussets of equal uniform depth, can be maintained by process and apparatus of the patent wherein the internal air pressure cooperates with external gusseting members without employing shaping members within the tubing.

The present invention provides an improvement over my earlier practice and involves the use of a novel spreader mechanism which is located within the continuously extruded tubing and which cooperates with the gusseting blade located externally of the tubing to positively form the gussets therein. The use of internal spreaders and associated gusseting mechanism embodying the present invention is particularly desirable for stiffer heavy wall tubing. The resulting product may be considerably more satisfactory than like tubing sized and gusseted solely by means of internal air pressure.

It is a principal object of the present invention to provide apparatus for positively gusseting flattened tubing by means of pressure exerted mechanically on both the interior and exterior of the tubing.

A further object is to provide a novel gusseting member which is operable within continuously extruding tubing, which cooperates with external gusseting blades to positively gusset the tubing, and which provides for automatic adjustment to accommodate and form gussets of various predeterminable depths in a wide range of tubing sizes.

Other objects and advantages will be apparent to those skilled in the art from the following detailed description made with reference to the accompanying drawing of an illustrative embodiment of the invention and in which drawings;

Figure 1 is a side elevation of apparatus for producing gusseted and flattened tubing in accordance with the invention;

Figure 2 is an enlarged view of the gusseted portion of the apparatus shown in Figure 1;

Figure 3 is a top plan view of the portion of the apparatus shown in Figure 2;

Figure 4 is a cross-sectional view taken along lines 4—4 of Figure 2;

Figures 5, 6 and 7 are fragmentary cross-sectional views of three modifications of the gusseting mechanism as viewed from line X—X of Figure 4; and Figure 8 is a plan view of the structure shown in Figure 7.

Referring to Figure 1 of the drawings, the illustrated embodiment of the invention includes a tubing die D in which a thin wall tubing T is continuously extruded, as by means of a suitable extruder mechanism fragmentarily shown at E, and which may include heating, homogenizing and pressure-producing parts or components, for forcing a plastic material, such as polyethylene, through the die D under proper extrusion conditions of temperature, pressure and homogeneity for the plastic material extruded.

Extending through the die D is a pressure line 1 controlled by a valve 2 through which a suitable fluid as, for example, air is introduced to maintain a desired pressure within the tubing T and expand it to a desired diameter.

The tubing T issuing from the die D is air cooled as it passes through a ring or circle of fishtail, gas-burner type, jets 3 which are mounted on a circular manifold 6. Manually operable needle valves 5 individually control the cooling air supplied to the jets 3 from the circular manifold 6 which is connected to a compressed air supply (not shown).

While for clarity of illustration only two of the jets 3 are illustrated in the drawings, in actual practice a much larger number, as for example twenty, are provided at equally spaced intervals about the manifold ring 6. The air from the jets 3 reduces the temperature and, consequently, the plasticity of the extruded tubing.

Differential regulation of the several jets serves to control uniformity of thickness of the blown tubing. Thus, when the tubing is blowing up unevenly, and a thin streak develops, a little more air from the jet 3 overlying this particular streak gives additional chilling to that portion of the tubing. The additional chilling reduces expansion and thinning of the underlying portion and greater uniformity of thickness is obtained.

The tubing T next passes through a series of three annular wind boxes 7a, 7b, 7c which direct cooling air against the tubing. The several wind boxes 7a, 7b, 7c may be supplied with air under pressure of a few inches of water from a common manifold 8 and blower 9. The air thus supplied to the wind boxes may be discharged into contact with the tubing T through a series of openings 7 which may be located at spaced intervals in the inner peripheral wall of each wind box and individually regulated in size by sliding dampers 10 or comparable control valves.

A series of freely rotatable horizontal rolls R and vertical rolls R' are provided to support and control the size of the tubing. The rolls R and R' are arranged transversely of and tangentially to the periphery of the tubing in spaced circles which are coaxially disposed relative to the wind boxes 7a, 7b, 7c and, as so disposed, limit the diameter to which the tubing is blown, substantially as shown in Figure 1.

After passing through the wind boxes 7a, 7b, 7c, and the rolls R and R', the tubing is partially collapsed by a roller assembly, which includes a series of metal rollers 11 located transversely of the tubing along two converging lines above and below the tubing substantially as shown and described in U. S. patent application, Serial No. 2,936, filed January 17, 1948, by Bailey and Reber.

The tube collapsing roller assembly includes a frame, generally designated 12, having vertical corner posts 13 secured in spaced relationship by upper and lower longitudinal frame members 14 and 15 and by transverse spacing members 16. Corner braces 17 give the frames necessary rigidity. The rollers 11 are journaled in pairs of upper and lower longitudinal frame members 18 and 19, respectively, the upper pair of frame members 18 being secured in proper spaced relation by fore and aft transverse members 18a and 18b and the lower pair of frame members 19 being similarly secured by fore and aft transverse members 19a and 19b. The forward end of the roller frames 18 and 19 are supported by the ends of chains 20, the latter being supported by sprockets 21 and secured at the ends of a shaft 22 rotatably mounted in the forward ends of the members 14. Clockwise rotation (Figure 1) of the sprockets 21 operates chains 20, so as to raise the forward end of the upper roller frame 18 and simultaneously lower the forward end of the lower roller frame 19 so as to enlarge the distance of the frame members 18 and 19 from the center line of the tubing T a like amount. As is apparent from the drawings, counterclockwise rotation of the sprocket 21 reduces the distance between the upper and lower roller frame members 18 and 19 a like amount above and below the center line of the tubing T.

The aft ends of the frame members 18 and 19 are similarly supported and their positions adjusted by chains 20a which engage sprockets 23 secured to the ends of a transverse shaft 24 rotatably journaled in the longitudinal frame members 14.

In order to assume sufficient cooling of the tubing and thus prevent sticking to the rollers 11, additional cooling is provided by like upper and lower blowers 25 and 26 which, respectively, are mounted on the upper and lower frames 18 and 19 and the air from which is directed by suitable ducts 25a and 26a towards both upstream banks of upper and lower rollers 11 and the portion of the tubing engaged thereby.

From the rolls 11, the tubing is drawn by a pair of driven pulling rolls P through a gusseting mechanism, generally designated G, which acts to further collapse the tubing and, at the same time, in cooperation with an internal speader mechanism, generally designated S, and the air pressure introduced through line 1 forms gussets 27 at the sides of the collapsing tube as is described in greater detail hereinafter. From the pulling rolls P the collapsed and gusseted tubing is fed to and wound in a roll 28 upon the driven arbor 29 of a winding machine.

Referring more particularly to the gusseting mechanism G, it includes a lower shaping member 30 and an upper shaping member 31 which are spaced apart in converging relationship by pairs of upper and lower tapering wedge members 32 and 33 located adjacent the side edges of the members 30 and 31. As shown in the drawings, the members 30 and 31 and wedges 32 and 33 are adjustably secured together by bolt and nut fasteners 34.

In the embodiment illustrated, inner surfaces 32a and 33a of each pair of wedges 32—33 are disposed in spaced vertical planes, corresponding points of which are located at equal distances from the axis or center line of the tubing T which passes therebetween. The vertical planes defined by the surfaces 32a and 33a of each pair of wedges may be parallel as shown in Figure 3 or, depending upon the depth of the gussets and the angle of convergence of the upper and lower shaping members 30 and 31, the side planes may converge or diverge to properly accommodate the tubing.

Interposed between each pair of side wedges 32—33 is an inwardly projecting blade 35 having rounded inner edges 35a and suitably slotted openings (not shown) through which the bolt fasteners 34 extend, thus permitting adjustment of the blades 35 so that the edges 35a converge at the proper angle to deepen the gussets or folds 27 in the tubing as the latter is collapsed by the converging top and bottom shaping members 31 and 30 and restrained at a desired width by the side walls 32a and 33a.

As best shown in Figure 3, the internal spreader member S includes a pair of spaced arms 37 and 38 which are individually pivoted to opposite ends of a cross member 39 at points equally spaced from the upstream ends of the arms, the latter being resiliently tensioned toward one another by a spring 40 whereby the downstream ends of the arms 37 and 38 resiliently press the tubing into engagement with the gusseted blades 35. As best shown in Figure 4, the arms 37 and 38 are provided with grooves 41 and 42, respectively, which receive the blades 35 and the portion of the tubing which overlies each blade.

The upstream ends of the arms 37 and 38 are anchored by means of a cable 43 to the die D internally of the tubing. The tension created in the cable 43 by the frictional pull of the tubing on the spreader arms plus the pressure exerted by the spring 40 serves to exert a force against the tubing underlying the grooves 41 and 42 which positively forces the tubing over the blades 35 and establishes and maintains the desired gusset folds in the tubing. It will be apparent that the slots in the blades 35 and wedges 32—33 permit adjustment of the gusseting mechanism G so as to vary the depth of the gussets and to adapt the mechanism to tubing in a wide range of sizes.

Figure 5 illustrates a modified construction for the arms 37 and 38 wherein a grooved shoe 44 is pivotally attached to the downstream end of each arm and the shoe rather than the groove in the arm 37 cooperates with the blade 35.

Figure 6 illustrates a grooved roller 45 rotatably supported on the spreader arm 37 and Figure 7 shows rollers 46 and 47 rotatably supported in a shoe 44' which is pivotally secured to the arm 37. Although not shown in the drawings, the arms 38 are, of course, similarly modified in the embodiments shown in Figures 5–7.

The embodiments shown in Figures 6 and 7 reduce friction and those shown in Figures 5 and 7 provide for identical cooperation of the grooved member with the blades 35 regardless of the angle which the arms 37 and 38 make with the center line of the tubing.

Other modifications of the invention will be apparent to those skilled in the art and it therefore will be understood that the described embodiment is merely illustrative of the invention, the scope of which is defined by the appended claims.

I claim:

1. Apparatus for forming gusseted seamless tubing of thermoplastic material including an annular tubing die, an extruder for continuously extruding thermoplastic material from the annular die in the form of a seamless tube, means for introducing fluid pressure into the tube to inflate successive portions of the tube, apparatus for mechanically exerting pressure on both the interior and exterior of the inflated tubing to gusset said tubing, and means for collapsing the gusseted tubing.

2. Apparatus for forming gusseted seamless tubing of thermoplastic material including an annular tubing die, an extruder for continuously extruding thermoplastic material from the annular die in the form of a seamless tube, means for introducing fluid pressure into the tube to inflate successive portions of the tube, a confining passageway through which the tubing may be continuously drawn, blades extending into the passageway to engage the outer surfaces and form tucks in the tubing passing therethrough, a device within said tubing for mechanically pressing said tubing into engagement with said blades, and means for collapsing said tubing with said tucks therein.

3. Apparatus as described in claim 2 and wherein said mechanical pressing device includes members which straddle said blades with the wall of the tubing therebetween.

4. Apparatus as described in claim 2 and wherein said mechanical pressing device comprises a pair of pivotal arms each of which straddles and resiliently presses against a different blade.

5. Apparatus as described in claim 4 and wherein the mechanical pressing device is anchored within the seamless tubing.

6. Apparatus as described in claim 4 and wherein said arms are pivoted at spaced points to a common intermediate member.

7. Apparatus for forming gusseted seamless tubing of thermoplastic material including an annular tubing die, and extruder for continuously extruding heated thermoplastic material from the annular die to form a tube, means for introducing inflating fluid pressure into the tube, a confining passageway through which said inflated fluid pressure passes having blades extending into said passageway for gusseting the inflated tube, a pair of pivoted arms within said seamless tubing, each arm having a device pivotally mounted thereon, an including a portion adapted to straddle and press against a gusseting blade with the wall of the tubing therebetween, means for resiliently pressing said devices towards said blades and means for collapsing said gusseted tubing.

8. Apparatus as described in claim 7 and including means for anchoring said blades within seamless tubing.

9. Apparatus as described in claim 8 wherein said pivoted device includes a roller having a peripheral groove which provides said portion for straddling and pressing against said gusseting blade.

CLARENCE G. REBER.

REFERENCES CITED

The following references are of record in the file of this patent:

UNITED STATES PATENTS

| Number | Name | Date |
|---|---|---|
| 336,646 | Lorenz | Jan. 5, 1886 |
| 467,553 | Ehst et al. | Jan. 26, 1892 |
| 1,522,234 | Freegard et al. | Jan. 6, 1925 |
| 2,047,554 | Fischer | July 14, 1936 |
| 2,529,897 | Bailey et al. | Nov. 14, 1950 |
| 2,544,044 | Reber et al. | Mar. 6, 1951 |

FOREIGN PATENTS

| Number | Country | Date |
|---|---|---|
| 431,619 | Great Britain | July 11, 1935 |